United States Patent Office 2,718,959
Patented Sept. 27, 1955

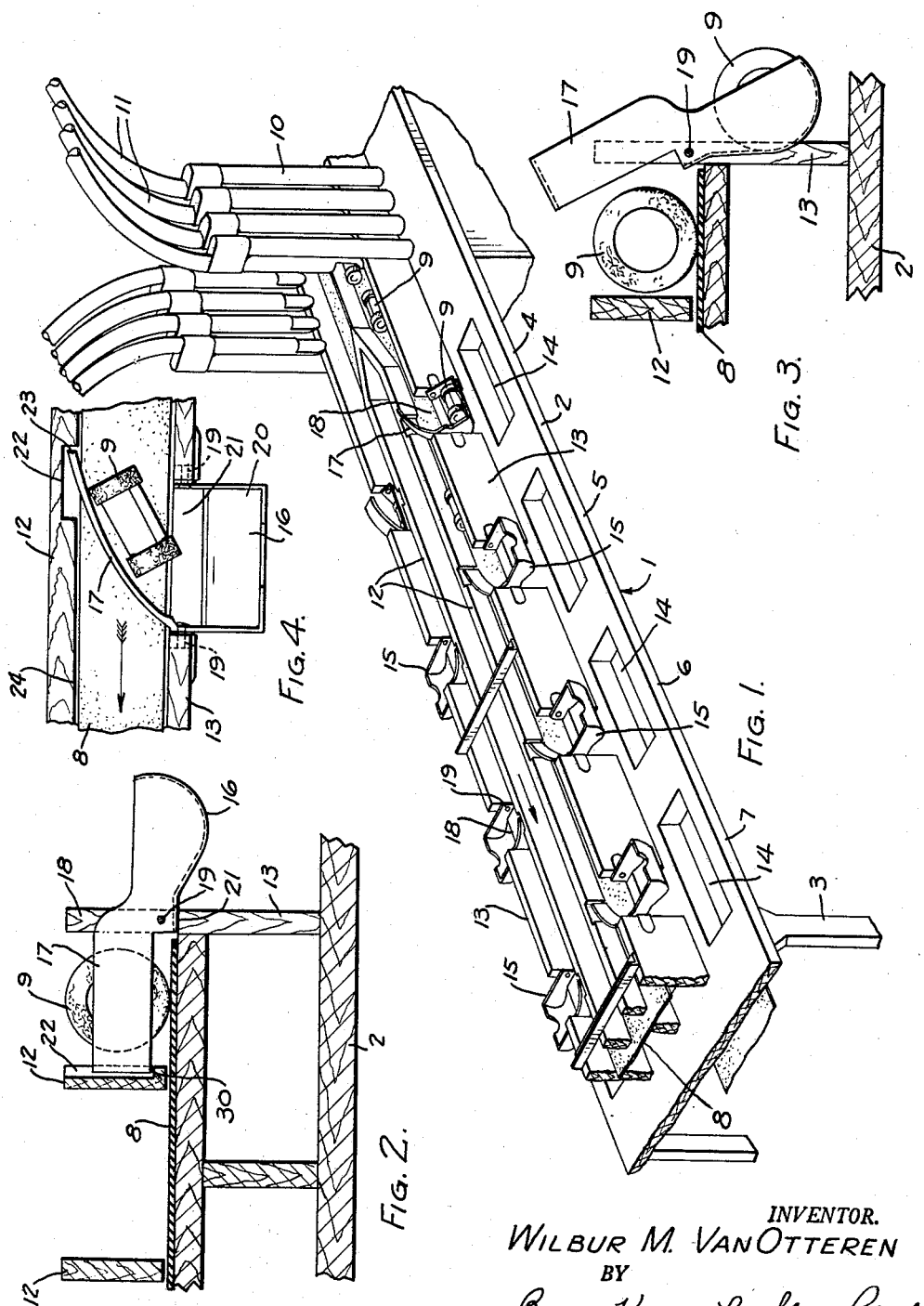

2,718,959

PICKOFF CHUTE FOR PNEUMATIC TUBE SYSTEMS

Wilbur M. Van Otteren, Detroit, Mich., assignor to The Grover Company, Detroit, Mich., a corporation of Michigan Application November 6, 1951, Serial No. 255,037

8 Claims. (Cl. 198—42)

This invention relates to a cashier pickoff chute for pneumatic tube systems.

In a pneumatic tube carrier system the carriers containing cash or charge slips are conveyed to a central receiving desk where the cashiers receive the carriers and separate the cash from the charge transactions. In cash transactions the cashier makes the necessary change which is deposited in a carrier along with the receipted bill and returned through the pneumatic tube system to the sale's station. With a charge item the cashier files the charge slip or bill and returns the empty carrier back to the sale's station. At each receiving desk, particularly during the busy hours, there will be several cashiers working at the receiving desk. As the carriers reach the receiving desk the problem arises of efficiently handling these carriers so that the carriers will be distributed among the cashiers, the charge or cash transaction completed and the carriers returned to the sale's station with efficiency and dispatch.

The invention contemplates a device for each cash desk or station which automatically picks a carirer off the conveying belt of the receiving desk and holds that carrier in readiness for the cashier to complete the cash or credit transaction. As long as the pickoff device for any cash desk is occupied by a carrier, the conveyor conveys the carrier on to the next unoccupied pickoff device. Hence, the distribution of the carriers along the receiving desk is determined by the need for carriers at any service desk and the ability of the cashier to handle that carrier. If the cashier at the receiving end of the receiving desk is busy, the carriers will not pile up at this desk but will be distributed on down the line to those desks which are not busy.

In the drawing:

Fig. 1 is a perspective view showing a receiving desk for a pneumatic tube carrier system equipped with carrier pickoff chutes which are the subject of this invention.

Fig. 2 is a transverse section through the receiving desk showing the normal position of the pickoff chute without a carrier.

Fig. 3 is a fragmentary transverse section showing the position of the pickoff chute after it has picked a carrier off the conveyor and while it is holding this carrier for the cashier.

Fig. 4 is a fragmentary top plan view showing the carrier chute in the act of picking a carrier off the receiving desk conveyor belt.

Referring more particularly to the drawings, there is shown a receiving desk generally designated 1. The receiving desk comprises a top or platform 2 supported on legs 3, a plurality of stations generally designated 4, 5, 6, 7, a belt conveyor 8 which receives carriers 9 from the discharge ends 10 of the pneumatic delivery tubes 11. The pneumatic tube carrier system 10, 11 is shown by way of example because any other known type carrier system can be used for delivering the carriers 9 to, and depositing them upon, the conveyor belt 8. The carriers 9 upon being deposited upon belt 8 are conveyed by the belt along a trough comprising upstanding walls 12 and 13.

Each station 4, 5, 6 and 7 comprises a cash well or desk 14 and a tube pickoff device generally designated 15. As is evident from the drawing, the receiving desk is symmetrical and provided with stations and pickoff devices along each side.

Each pickoff device or chute comprises a pocket 16 and a deflector 17 which are preferably, but not necessarily, made or cast integral. The outside vertical wall 13 of the trough is provided with a plurality of recesses 18, one for each service desk. A pickoff member 16, 17 is pivotally mounted in each recess upon pintles or axes 19 so that the bottom wall 20 of the trough 16 is flush with the side edge of conveyor belt 8 as at 21. The pocket 16 is positioned on the outside of wall 13. The deflector 17, which also acts as a counterweight, extends above and over conveyor belt 8 from wall 13 toward and into a notch 22 in wall 12. Notch 22 is preferably provided so that the outer end 23 of deflector 17 is flush with the inner face 24 of wall 12 when the pick up is in operative position over the conveyor belt 8. This prevents any carrier from jamming against the end 23 of deflector 17.

It will be noted that in the normal unloaded position of the pickoff 16, 17 the deflector 17 overbalances pocket 16 and rests against stop 30 in wall 12 so that deflector 17 is positioned in the path of carriers 9.

The operation of the device is as follows: The normal position of the pickoff device or chute 16, 17 without a carrier is shown in Fig. 2. At this time the weight of deflector 17 overbalances the weight of pocket 16 and consequently holds the pocket 16 in raised position and the deflector is positioned over the belt 8 in the line of travel of the carriers 9. The deflector 17 as shown in Fig. 4, is positioned at an acute angle with respect to the side wall 13 so that any carrier being conveyed along conveyor 8 will be deflected by deflector or chute 17 into pocket 16.

As carriers 9 are deposited from tubes 11 upon conveyor 8 they are conveyed to the left, Figs. 1 and 4, as indicated by the arrows. As shown in Fig. 4, if the pocket 16 is empty, then as the conveyor 8 brings the carrier 9 into contact with the deflector 17, the carrier 9 is deflected into the pocket 16 of the pickoff device and the combined weight of the carrier 9 and the pocket 16 overbalances the weight of deflector 17 and causes the pick up 16, 17 to tilt clockwise to the position shown in Fig. 3 where the deflector 17 now clears the path of travel of the carirers 9. As shown in Fig. 1, the first pickoff device at station 4 has picked up a carrier 9 and the deflector 17 is raised so that the succeeding carriers 9 can pass by the station 4. As long as the operator at station 4 is busy and unable to remove the carrier 9 from the pocket 16 at station 4, the carrier 9 on conveyor 8 will be conveyed by station 4.

As shown in Fig. 1, the operator at station 5 has removed the carrier from the pick up device 15, and is completing the charge or cash transaction. Hence, the pick up device at station 5 is in position to pick the next carrier 9 off the conveyor 8 and deposit it in the pocket 16 at station 5. As shown in Fig. 1, the cashiers at stations 6 and 7 are in a condition to handle additional cash or charge transactions because the pickoff devices 16 at these stations are empty and in position to pickoff a carrier 9 from the conveyor 8.

As soon as the cashier at station 4 removes the carrier 9 from the pick up pocket 16, the pick up device 16, 17 will swing counterclockwise from the position shown in Fig. 3 to the position shown in Fig. 2 where it will pickoff the next carrier coming along the conveyor 8.

Thus, it will be seen that these pickoff devices prevent a carrier jam at any one station and distribute the carriers along the stations of the receiving desk in accordance with the ability of the operator at each station to handle the carriers and complete the cash or credit transaction.

I claim:

1. In a carrier system of the type having a receiving desk with a plurality of stations and a conveyor extending along said desk by said stations and adapted to receive and convey carriers along a path, a pickoff device for at least one of said stations comprising a deflector and pocket fixed together, said deflector in its normal position overlying said conveyor at the station in the path of said carirers, a pivotal support for said deflector and pocket positioned between said deflector and pocket, said deflector normally overbalancing said pocket whereby the deflector overlies said conveyor in the path of said carriers, the weight relationship between said pocket and deflector being such that when the deflector coacts with said conveyor to deflect a carrier into said pocket then the combined weight of the carrier and pocket overbalances said deflector and swings the deflector upwardly relative to said conveyor out of the path of said carriers.

2. The combination defined in claim 1 wherein said deflector extends at an angle from said pocket transversely across said conveyor whereby it deflects a carrier from the conveyor into the said pocket.

3. The combination defined in claim 2 wherein said pocket is offset from the path of travel of said carrier.

4. In a carrier system of the type having a receiving desk with a plurality of stations and a conveyor extending along said desk by said stations and adapted to receive and convey carriers along a path, a pickoff device for at least one of said stations comprising a deflecting means normally adapted to overlie said conveyor at the station in the path of said carriers, a movable carrier receiver adapted to hold a carrier, said carrier receiver being disposed at all times out of the path of travel of carriers on said conveyor and being responsive to gravity when it receives a carrier to move from a carrier receiving position to a second postion accessible to an operator at said station and to move from said second position to said receiving position whenever a carrier is removed therefrom, said deflecting means in its normal position being stationary relative to said conveyor and coacting with the conveyor to deflect the carrier as it is advanced by the conveyor into said carrier receiver, a support for said deflector upon which said deflector is movable relative to said conveyor out of the path of said carriers, and a mechanical connection between said deflector and carrier receiver effective when a carrier is deposited in said carrier receiver to move said deflector relative to said conveyor out of the path of said carriers and effective whenever a carrier is removed from said pocket to move said deflector into the path of travel of said carriers on said conveyor.

5. In a carrier system, a trough having upstanding walls, a conveyor running along the bottom of said trough and adapted to receive and convey carriers along said trough, a pick up device movably supported in a wall of said trough, said pick up device comprising a deflector normally adapted to overlie the conveyor within the trough in the path of said carirers, a carrier receiver adapted to hold a carrier, and a connection between said deflector and carrier receiver whereby when the deflector deflects a carrier into said receiver the pick up device is actuated to remove said deflector from the path of said carriers, said receiver being positioned at all times without the walls of said trough, said deflector and receiver being fixed together and being pivoted in a wall of said trough along an axis at the junction of said deflector and receiver, the weight of the deflector overbalancing the weight of the receiver, the weights of said deflector and receiver being such that when a carrier is deposited in the receiver the combined weight of the carrier and receiver overbalances the weight of the deflector and the deflector swings upwardly from the path of said carriers.

6. In a carrier system, a conveyor adapted to receive and convey carriers along a path, a pickoff device for removing carriers from said conveyor, said pickoff device comprising a pocket member, means for pivotally supporting the pocket member with the entry floor of the pocket substantially flush with the top surface of said conveyor, and a deflector arm carried by said pocket and extending from the downstream end of the pocket angularly upstream and across the top surface of the conveyor, the relative weights of said arm and pocket being such that the arm overbalances the pocket and is normally positioned over said conveyor in the path of said carriers whereby when the arm deflects a carrier into the pocket then the pocket and carrier overbalances the deflector arm and pivots the same upwardly out of the path of said carriers.

7. The combination defined in claim 6 including means for pivoting said pickoff member on an axis along the entry to said pocket and adjacent said conveyor.

8. In a carrier system, a conveyor adapted to receive and convey carriers along a path, spaced walls along said conveyor defining a trough along which the carriers are conveyed, one of said walls having a recess therein, a pickoff device for removing carriers from said conveyor, said pickoff device comprising a pocket member, means for pivotally supporting the pocket member with the entry floor of the pocket substantially flush with the top surface of said conveyor, and a deflector arm carried by said pocket and extending from the downstream end of the pocket angularly upstream and across the top surface of the conveyor, the relative weights of said arm and pocket being such that the arm overbalances the pocket and is normally positioned over said conveyor with the outer end of the arm positioned in said recess flush with the inner face of said recessed wall and in the path of said carriers whereby when the arm deflects a carrier into the pocket then the pocket and carrier overbalances the deflector arm and pivots the same upwardly out of the path of said carriers.

References Cited in the file of this patent

UNITED STATES PATENTS 1,616,418     Hepperle  ---------------- Feb. 1, 1927